March 13, 1962 S. E. JOHNSON ETAL 3,025,471

FREQUENCY DISCRIMINATOR CIRCUIT

Filed July 17, 1956

INVENTORS.
Stanley E. Johnson
William E. Green
BY
Harness & Harris
ATTORNEYS.

United States Patent Office 3,025,471
Patented Mar. 13, 1962

3,025,471

FREQUENCY DISCRIMINATOR CIRCUIT

Stanley E. Johnson, Royal Oak, and William E. Green, Detroit, Mich., assignors, by mesne assignments, to the United States of America as represented by the Secretary of the Army Filed July 17, 1956, Ser. No. 598,330
1 Claim. (Cl. 329—126)

This invention relates to improvements in frequency discriminator circuits and more particularly to an electrical circuit for demodulating an alternating current input signal so as to give both a qualitative and a quantitative indication of changes in the frequency of the signal.

An object of the present invention is to provide a highly efficient and improved frequency discriminator or demodulator circuit of comparatively simple and inexpensive design suitable for demodulating a carrier frequency for use in FM radio reception or in special purpose circuits such as in electronic telemetering instruments, frequency meters, or other applications where the detection of frequency variations of an alternating current is desired.

Another object is to provide an improved frequency discriminator or demodulator circuit which is particularly sensitive to input signals of low power and which produces a comparatively high power output signal, thereby enabling reduction of components and accordingly the cost of FM demodulators and the like.

Another object is to provide such a frequency discriminator or demodulator circuit which operates effectively without recourse to tuned circuits or customary relaxation oscillators and which accordingly avoids the complexities and disadvantages of such circuits and operates comparatively independently of the frequency, amplitude, and wave shape of the input or carrier signal potential, the sensitiveness of the present invention being determined primarily by the type of components used.

Another and more specific object is to provide an improved frequency discriminator or demodulator comprising a resistor-condenser time delay circuit coupled with an operative signal detecting circuit adapted to operate at one condition, when the potential of the input signal is within a narrow range approximately equal to a predetermined reference potential, and to operate at a second condition when the potential of the input signal is outside of the predetermined narrow range. The coupled circuits are effective to change the condition of charge of the time delay capacitor in one direction at a predetermined retarded rate, when the signal detector circuit is at one of its two conditions of operation, and to change the charge of said capacitor in the opposite direction at an accelerated rate when the signal detector circuit is at its second condition of operation. In consequence the resultant average charge of the capacitor will be a function of the frequency at which the potential of the input signal enters and leaves the aforesaid predetermined narrow potential range.

The foregoing objects are accomplished in a preferred embodiment of the present invention wherein the reference potential is defined as the ground or zero potential of the input signal and the time delay capacitor is charged at the retarded rate during the major portion of the input signal when the potential of the latter is outside of a predetermined narrow range containing the ground or zero potential. During the comparatively short time that the potential of the alternating input signal is within the aforesaid narrow range, the capacitor is discharged rapidly to a predetermined base value. It is apparent that within the broader aspects of the invention, the charging and discharging periods of the time delay capacitor can be interchanged, in which case the capacitor is discharged at the retarded rate, when the signal potential is outside of the predetermined narrow range, and is charged at the accelerated rate when the signal potential is within the predetermined narrow range.

Other objects of this invention will appear in the following description and appended claim, reference being had to the accompanying drawings forming a part of this specification wherein like reference characters designate corresponding parts in the several views.

Figure 1:
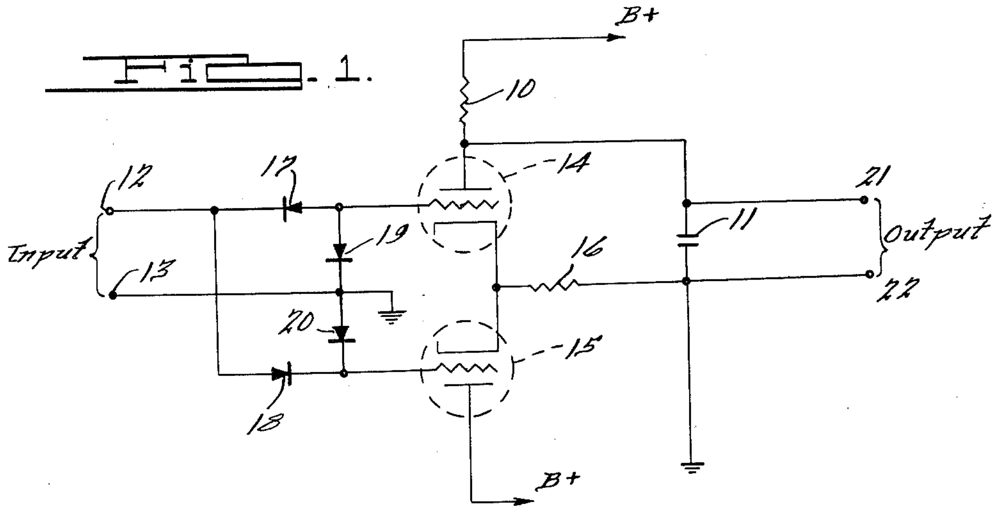
FIGURE 1 is a schematic electrical circuit of the present invention.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A preferred embodiment of the present invention is illustrated by way of example in the drawings wherein a suitable positive potential supply B-plus is connected through resistor 10 and capacitor 11 of a time delay circuit to a suitable reference potential hereinafter referred to as the zero or ground potential. Variable impedance means having control elements responsive to the potential of an input signal applied at terminals 12 and 13 is provided in a signal receiving circuit to effect a discharge path for the condenser 11. Any suitable variable impedance which can be readily controlled in response to a low power input signal can be employed, such as a transistor type or an electronic tube type variable impedance.

In the present instance a pair of grid controlled vacuum tubes or triodes 14 and 15 are employed having their cathodes connected through a common biasing resistance 16 to ground. The plate of tube 14 is connected through resistance 10 to B-plus, whereas the plate of tube 15 is connected directly to B-plus. The grid of tube 14 is connected to terminal 12 through a diode rectifier 17 to receive signal impulses of negative potential. The grid of tube 15 is connected to terminal 12 through a diode rectifier 18 to receive signal impulses of positive potential. The grids of tubes 14 and 15 are also connected to ground through diode rectifiers 19 and 20 respectively, diode 19 being arranged to maintain the grid of tube 14 at the ground or reference potential when the signal potential at 12 is either zero or positive with respect to the reference potential. Similarly diode 20 is arranged to hold the grid of tube 15 at the ground potential when the input signal potential at 12 is either zero or negative.

Any suitable type of rectifier can be used for the elements 17, 18, 19, and 20, each being schematically illustrated in the present instance according to customary practice to transmit positive impulses readily in the direction of its arrow or barb and to transmit negative impulses oppositely to the direction of its arrow. Also in the present instance, the rectifier elements 17 through 20 are selected to assure sufficiently low back resistance to serve as grid leak resistors to prevent development of an objectionable bias potential on the grids of tubes 14 and 15. Thus during the positive half cycle of an input signal applied at terminal 12, a negative charge remaining on the grid of tube 14 from the preceding negative half cycle can leak back through rectifiers 17 and 19 to return the potential of the latter grid to the zero or reference potential. Similarly during the negative half cycle of the input signal, a positive grid charge of tube 15 from the preceding positive half cycle can leak back through rectifiers 18 and 20 to return the potential of the latter grid to the zero or reference potential.

By virtue of the structure disclosed, when tube 14 is not conducting plate current, condenser 11 will eventually charge through resistance 10 to B-plus, its potential being measured across output terminals 21 and 22. Resistor 16 is selected to bias the cathode-plate potential of tube 14 close to plate current cutoff, such that when the grid potential of tube 14 is approximately zero within a narrow range as explained below, tube 14 will conduct plate current and rapidly discharge condenser 11 through tube 14 and resistance 16 to the reduced plate potential of tube 14. The latter potential will then equal B-plus reduced by the value of the potential drop across resistance 10 resulting from the plate current therethrough. In this regard, resistance 16 must be small in comparison to resistance 10 in order to enable a rapid discharge of condenser 11 during the time that tube 14 is conducting plate current.

When the grid potential of tube 14 is more than slightly negative, the plate current of tube 14 will be cut off sharply and condenser 11 will charge toward B-plus at a retarded rate determined by the size of resistor 10. In order to block plate conduction of tube 14 when the input signal potential is positive by more than a predetermined small amount, resistance 16 is also selected to bias the cathode-plate potential of tube 15 to effect a sharp increase in the latter's plate conduction when its grid potential becomes positive by more than the aforesaid predetermined small amount, thereby to raise the cathode potential of tube 14 sufficiently to prevent the latter from conducting plate current.

In summary, tubes 14 and 15 are selected so that when the signal potential applied across terminals 12 and 13 deviates either positively or negatively from the zero or reference potential and goes beyond the aforesaid narrow range within which tube 14 conducts, the latter's plate current will be cut off sharply, causing condenser 11 to charge through the time delay resistor 10 toward B-plus at the aforesaid retarded rate. When the signal potential is approximately zero within the aforesaid narrow range, tube 14 will conduct plate current and condenser 11 will discharge rapidly to the resulting reduced potential of the plate of tube 14.

Figure 2:
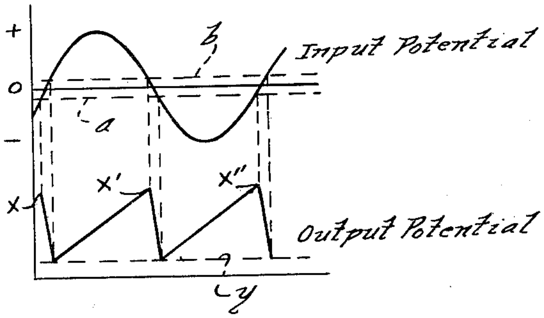
FIGURE 2 is an enlarged diagrammatic view comparing the input and output potentials without reference to their absolute values, time extending along the abscissa and potential along the ordinate.

FIGURE 2 compares the potential of a full cycle of an input signal applied at terminals 12 and 13 with a corresponding cycle of the output signal across terminals 21 and 22. At the start of the input cycle when the potential at 12 is approximately zero within the narrow range between $a$ and $b$, tube 14 will conduct as aforesaid and the output potential will drop rapidly from its previously existing value $x$ to a base value $y$ as condenser 11 discharges through tube 14 and resistance 16, $y$ being the resulting plate potential of tube 14 at optimum plate current. During the interval that the input signal potential at 12 is positive and greater than the predetermined minimum value $b$, this potential is transmitted to the grid of tube 15 through rectifier 18, thereby to increase the combined plate and grid conduction of tube 15 sufficiently to block plate conduction of tube 14 as aforesaid. Accordingly the output potential across 21—22 will rise along the line $y$—$x'$ as condenser 11 charges at the retarded rate through resistance 10.

Thereafter, when the signal potential again approximates the zero or reference value and drops below $b$, but not below $a$, tube 14 will conduct to discharge condenser 11 and reduce the output signal potential rapidly from $x'$ to $y$ as before. During the negative portion of the input signal when the potential at 12 drops below $a$, this potential is transmitted to the grid of tube 14 through rectifier 17 to block conduction of tube 14, whereupon condenser 11 again recharges at the retarded rate along the line $y$—$x''$. The foregoing cycle thus repeats itself with each cycle of the input signal, the values $x$, $x'$, and $x''$ being determined in each case by the length of the time interval during which tube 14 does not conduct.

Figure 3:
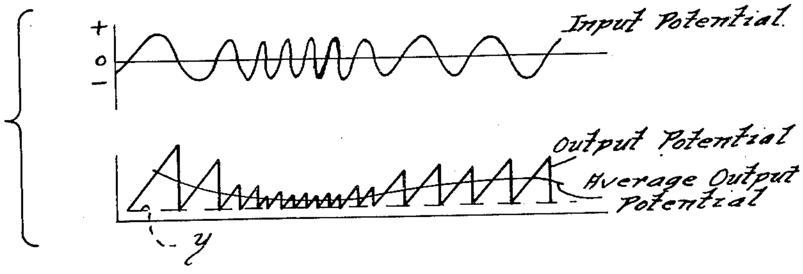
FIGURE 3 is a view similar to FIGURE 2, but showing on a reduced scale how the average potential of the output signal varies with the frequency of the input signal.

It is apparent that the higher the frequency of the input signal, the more often will the input potential cross the approximate zero potential range between $a$ and $b$ and the less time will be available for condenser 11 to charge through resistance 10. Thus the smaller will be the average output potential across terminals 21—22, as indicated in FIGURE 3. Conversely as the input signal frequency becomes smaller, the less often will the input potential cross the approximate zero range and the more time will be available to charge condenser 11. When the frequency of the input signal increases, the average output potential will approach the base potential $y$. When the input signal frequency decreases, the average output potential will approach B-plus.

In order to assure an appreciable output potential change during the period that plate current of tube 14 is cut off, the time constant of the time delay circuit 10—11 will be of the magnitude of the time interval between successive cycles of the input signal, but will be sufficiently large so that condenser 11 will charge only to a fraction of the B-plus potential during any one of the positive or negative potential loops of the input signal.

We claim:

A frequency discriminator circuit for demodulating input voltage signals passing through a reference potential, first and second electron tubes, each having an anode, a grid, and a cathode, a first resistor of a value which will bias said first electron tube close to plate current cutoff connected at one end to both cathodes, means for applying said reference potential to the other end of said first resistor thereby to bias said cathodes above said reference potential to block plate conduction of said first tube when its grid potential is negative a predetermined small amount with respect to said reference potential, means for applying an operating potential directly to the anode of the second tube and through a second resistor to the anode of the first tube, circuit means for receiving said input signals and connected with the grid of said first tube for limiting the signal potentials applied thereto substantially to potentials negative with respect to said reference potential, said circuit means being also connected with the grid of said second tube for limiting the signal potential applied thereto substantially to potentials positive with respect to said reference potential, thereby to cause increased conduction of said second tube to block conduction of said first tube by cathode bias when said signal potential is positive a predetermined small amount with respect to said reference potential, and a condenser having one end connected to said reference potential and the other end connected between the anode of the first tube and the second resistor, said second resistor having a large value of resistance in comparison to the first resistor, said condenser and second resistor forming a time-delay circuit effective to charge the condenser at a retarded rate when the plate current of said first tube is cut off, and said condenser discharging rapidly through said first tube and the first resistor when said signal potential is negative or positive said predetermined small amounts with respect to said reference potential and said first tube is conducting, the capacity of said condenser being sufficiently large so that its maximum charge received when each output pulse is negative or positive with respect to said reference potential by more than said predetermined small amounts will be substantially proportional to the time duration of said pulse.

References Cited in the file of this patent

UNITED STATES PATENTS

| | | |
|---|---|---|
| 2,445,996 | Bradley | July 27, 1948 |
| 2,467,486 | Krumhansl et al. | Apr. 19, 1949 |
| 2,530,081 | Ross | Nov. 14, 1950 |
| 2,658,180 | De Boisblanc | Nov. 3, 1953 |
| 2,702,854 | Woods | Feb. 22, 1955 |
| 2,719,225 | Morris | Sept. 27, 1955 |
| 2,770,727 | Hupert et al. | Nov. 13, 1956 |